(12) United States Patent
Cheng

(10) Patent No.: US 8,305,658 B2
(45) Date of Patent: Nov. 6, 2012

(54) AUTOMATIC DOCUMENT FEEDER AND SCANNING APPARATUS HAVING DEVICE FOR DETECTING DOCUMENT SPEED

(75) Inventor: Sung-Po Cheng, Hsinchu (TW)

(73) Assignee: Avison Inc. (TW)

( * ) Notice: Subject to any disclaimer, the term of this patent is extended or adjusted under 35 U.S.C. 154(b) by 606 days.

(21) Appl. No.: 12/507,528

(22) Filed: Jul. 22, 2009

(65) Prior Publication Data

US 2010/0270738 A1 Oct. 28, 2010

(30) Foreign Application Priority Data

Apr. 23, 2009 (TW) ................................ 98113476 A

(51) Int. Cl.
*H04N 1/04* (2006.01)

(52) U.S. Cl. ........ 358/498; 358/474; 358/496; 358/501; 399/167; 271/265.01

(58) Field of Classification Search ................... 358/474, 358/486, 497, 496, 498, 501; 399/329, 167; 271/265.01, 3.15, 10.01, 10.03, 109, 186
See application file for complete search history.

(56) References Cited

U.S. PATENT DOCUMENTS

| | | | | |
|---|---|---|---|---|
| 4,015,701 A | * | 4/1977 | Templeton | 400/611 |
| 4,969,016 A | * | 11/1990 | Kudoh | 399/18 |
| 5,445,251 A | * | 8/1995 | Redwood | 190/109 |
| 5,915,691 A | * | 6/1999 | Deguchi et al. | 271/265.01 |
| 6,034,784 A | * | 3/2000 | Gatto et al. | 358/1.18 |
| 6,356,735 B1 | * | 3/2002 | Hozumi | 399/395 |
| 7,481,421 B2 | * | 1/2009 | Tsukamoto et al. | 271/110 |
| 7,690,650 B2 | * | 4/2010 | Itoh et al. | 271/263 |
| 7,722,030 B2 | * | 5/2010 | Sugiyama et al. | 271/117 |
| 7,734,243 B2 | * | 6/2010 | Takiguchi et al. | 399/388 |
| 7,740,241 B2 | * | 6/2010 | Itoh et al. | 271/262 |
| 8,228,512 B2 | * | 7/2012 | Ogura et al. | 358/1.12 |
| 2004/0217541 A1 | * | 11/2004 | Horio | 271/121 |
| 2006/0088338 A1 | * | 4/2006 | Matsuda et al. | 399/167 |
| 2007/0152396 A1 | * | 7/2007 | Tanahashi et al. | 271/109 |
| 2009/0317147 A1 | * | 12/2009 | Ueda et al. | 399/301 |
| 2009/0324262 A1 | * | 12/2009 | Matsuda et al. | 399/36 |

* cited by examiner

*Primary Examiner* — Negussi Worku

(57) ABSTRACT

The invention provides an automatic document feeder for a scanning apparatus. The automatic document feeder includes a feeding passage, a feeding mechanism, a shaft, an idle roller, and a detecting device. The feeding mechanism is used for transporting a document along the feeding passage. The shaft is disposed at the feeding passage, and the idle roller is sleeved on the shaft. When the document is transported through the feeding passage, the idle roller is driven to rotate by the document. The detecting device detects a rotational speed of the idle roller and outputs a detection signal according to the rotational speed of the idle roller.

13 Claims, 7 Drawing Sheets

AUTOMATIC DOCUMENT FEEDER AND SCANNING APPARATUS HAVING DEVICE FOR DETECTING DOCUMENT SPEED

BACKGROUND OF THE INVENTION

1. Field of the Invention

The present invention relates to an automatic document feeder and a scanning apparatus therewith, and more particularly, relates to an automatic document feeder and a scanning apparatus able to detect a moving speed of a document and to control the scan timing accordingly.

2. Description of the Prior Art

Nowadays, scanners on the market can be equipped with an automatic document feeder for transporting a document or a stack of sheet past a stationary image-reading assembly automatically, so as to scan documents of multiple pages conveniently.

Please refer to FIG. 1. FIG. 1 illustrates an automatic sheet-fed scanning apparatus 1 of the prior art. The scanning apparatus 1 includes a feeding passage 10, a feeding roller 12 and transporting roller assemblies 141, 142, 143, and 144. The feeding roller 12 is driven by a motor for feeding a document 2 into the feeding passage 10. Afterwards, the transporting roller assemblies 141, 142, and 143, driven by the motor, transport the document 2 through the feeding passage 10. When the document 2 is transported past an image-reading assembly 16, the image-reading assembly 16 reads the context of the document 2.

The image-reading assembly 16 includes optical devices (for example, a light source and lenses) and a sensing device that may comprise charge-coupled device (CCD) sensors or contact image sensors (CIS). The moving speed of the document 2 past the scanning area 160 affects the quality of a scan image. Thus, if a high quality scan image is desired, the moving speed of the document 2 transported in the feeding passage 10 has to be constant while the document 2 passes by the scanning area 160.

Although the transporting roller assemblies 141, 142, 143, and 144 are driven by the same motor, the actual moving speed of the document 2 in the feeding passage 10 differs from a predetermined speed and the moving speeds of the document 2 at different locations of the feeding passage 10 are also different due to the differences of the diameters of the transporting roller assemblies 141, 142, 143, and 144 and the pressures of springs on the roller assemblies 141, 142, 143, and 144. Particularly, when the document 2 is transported past the scanning area 160, because the rotational speeds of the transporting roller assembly 143 and the transporting roller assembly 144 are different, which will lead to the fact that the widths of the scan lines of the image generated are different, the scan image will be distorted. For example, if the vertical scanning resolution is 600 dpi, the width of one scan line should be 1/600 inch. However, when the document 2 is transported past the scanning area 160 at a speed higher or slower than a predetermined speed, the width of the scan line is shorter or longer than 1/600 inch.

SUMMARY OF THE INVENTION

Accordingly, one embodiment of the present invention is an automatic document feeder able to detect an actual speed of a document in transporting for solving the above-mentioned problem.

The automatic document feeder includes a feeding passage, a feeding mechanism, a shaft, an idle roller, and a detecting device. The feeding mechanism is disposed beside the feeding passage for transporting a document along the feeding passage. The shaft is disposed at the feeding passage and the idle roller is sleeved on the shaft. When the document is transported through the feeding passage and contacts with the idle roller, the idle roller will be driven to rotate by the document through the contact force. The detecting device detects a rotational speed of the idle roller and outputs a detection signal according to the rotational speed.

Another embodiment of the present invention is a scanning apparatus for detecting the actual moving speed of the document. According to the actual moving speed of the document, the scanning apparatus adjusts the exposure time of an image sensor for each scan line to obtain a clear scan image.

The scanning apparatus includes an automatic document feeder, an image-reading assembly, and a control circuit. The automatic document feeder includes a feeding passage, a feeding mechanism, a shaft, an idle roller, and a detecting device. The feeding mechanism is disposed at the feeding passage for transporting a document along the feeding passage. The shaft is disposed at the feeding passage and the idle roller is sleeved on the shaft. When the document is transported to the feeding passage and contacts with the idle roller, the idle roller will be driven to rotate by the document through the contact force. The detecting device detects a rotational speed of the idle roller and outputs a detection signal according to the rotational speed. The control circuit is electrically connected to the detecting device and the image-reading assembly. The control circuit receives the detection signal from the detecting device and, according to the detection signal, outputs a control signal to the image-reading assembly for controlling the image-reading assembly to read the image of the document and to generate an image signal corresponding to the image of the document.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

DETAILED DESCRIPTION OF THE INVENTION

Figure 1:
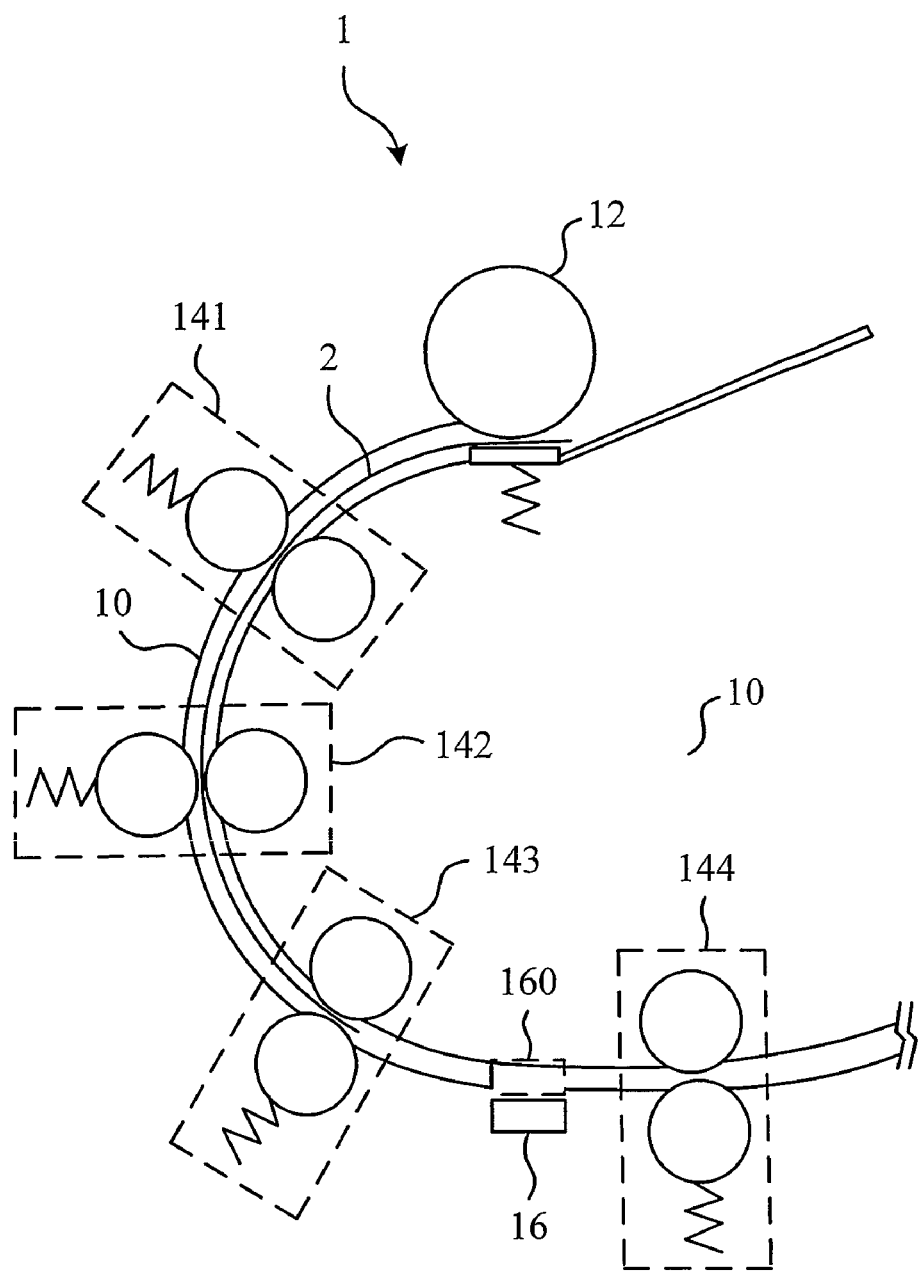
FIG. 1 illustrates a scanning apparatus of the prior art.
Figure 2A:
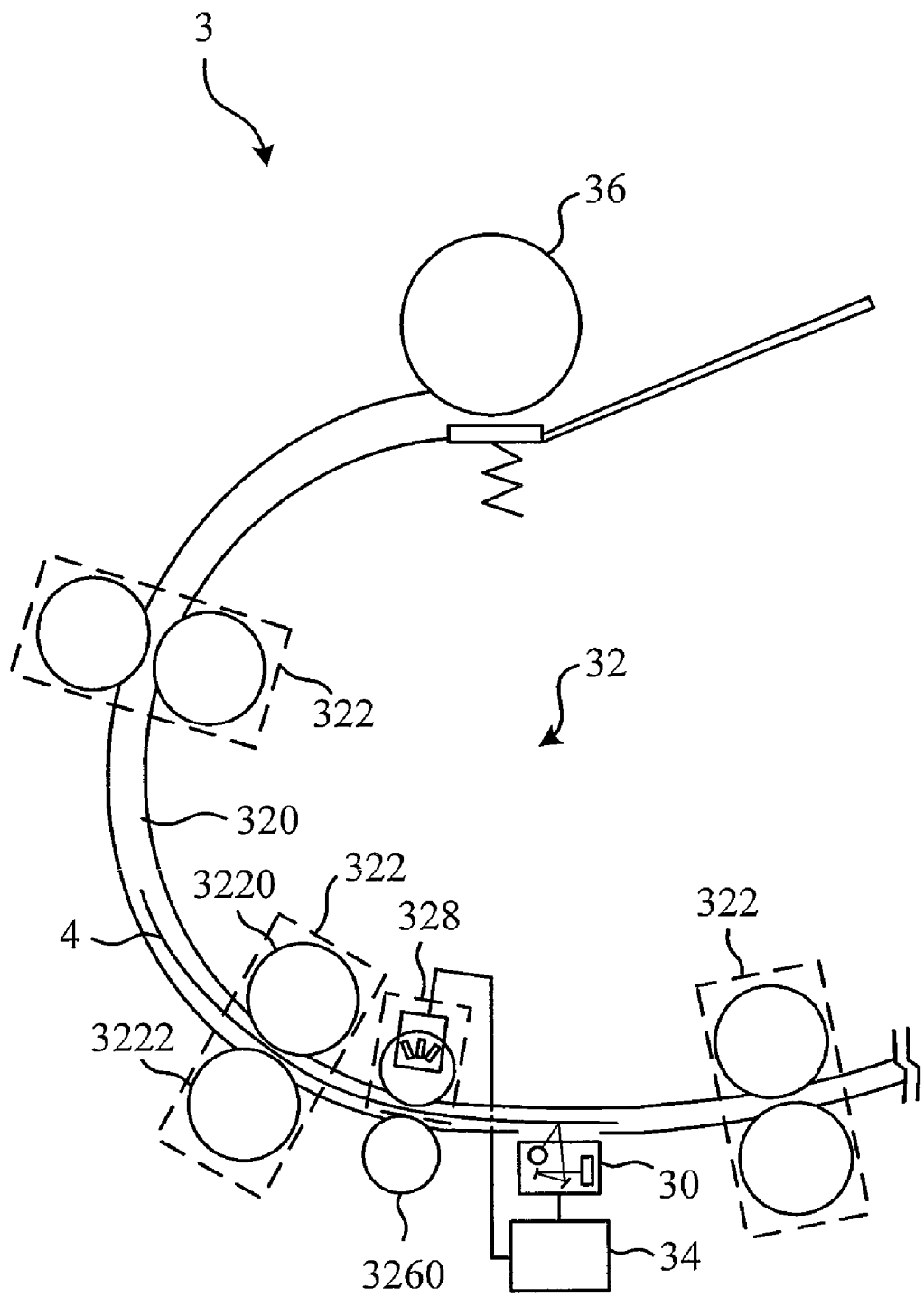
FIG. 2A illustrates a scanning apparatus of the invention according to an embodiment of the invention.
Figure 2B:
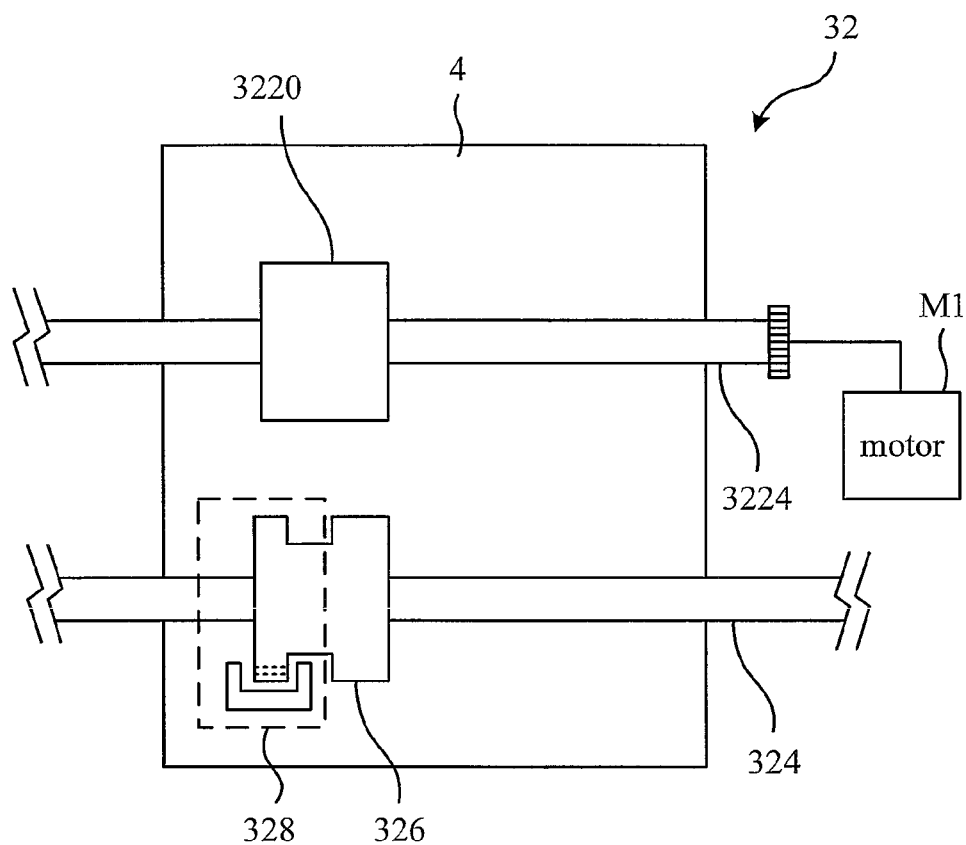
FIG. 2B illustrates a part of an automatic document feeder shown in FIG. 2A.

Please refer to FIG. 2A and FIG. 2B. FIG. 2A illustrates an automatic sheet-fed scanning apparatus 3 according to an embodiment of the invention. FIG. 2B illustrates a part of an automatic document feeder 32 shown in FIG. 2A. As shown in FIG. 2A, the scanning apparatus 3 includes an image-reading assembly 30, the automatic document feeder 32 and a control circuit 34. Therein the control circuit 34 is electrically connected to the automatic document feeder 32 and the image-reading assembly 30.

As shown in FIG. 2A and FIG. 2B. In this embodiment, the automatic document feeder 32 further includes a feeding passage 320, a plurality of transporting roller assemblies 322, a shaft 324, an idle roller 326, and a detecting device 328. The transporting roller assembly 322 includes a first roller 3220 and a second roller 3222. Therein the first roller 3220 is connected to a motor M1 through a transporting shaft 3224 for driving the first roller 3220 to rotate. The second roller 3222 is disposed opposite the first roller 3220 for clamping the document 4, so that the document 4 could be transported in the feeding passage 320. The motor M1 could be a stepper motor, a DC motor, and etc. Additionally, the scanning apparatus 3 could include a feeding roller 36 for feeding the document 4 into the feeding passage 320.

The idle roller 326 is sleeved on the shaft 324. A third roller 3260 is disposed opposite the idle roller 326 and the third roller 3260 could clamp the document 4 together with the idle roller 326 for transporting the document 4. When the document 4 is transported along the feeding passage 320 by the transporting roller assemblies 322, the frictional force between the document 4 and the idle roller 326 drive the idle roller 326 to rotate. Thus the traveling distance of the document 4 during a certain time interval could be determined according to the rotational speed of the idle roller 326.

Figure 2C:
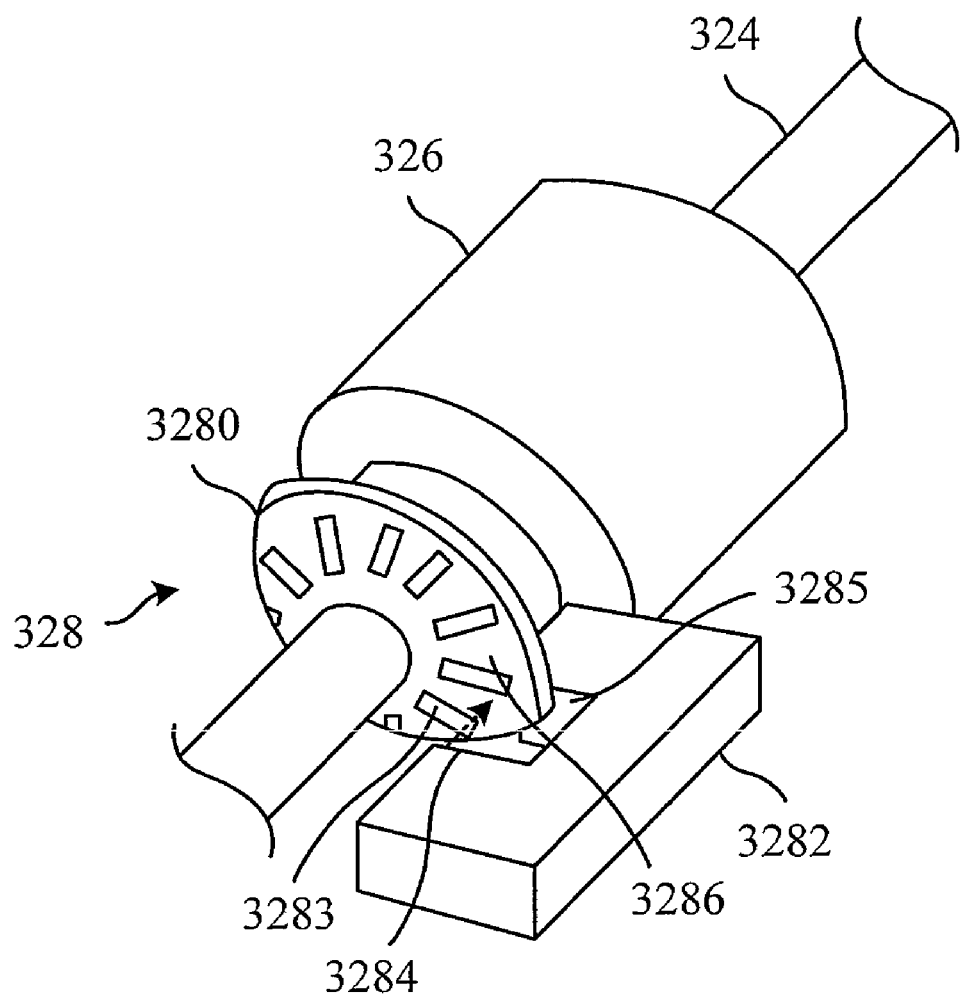
FIG. 2C illustrates a detecting device shown in FIG. 2A and FIG. 2B.

Please refer to FIG. 2C. FIG. 2C illustrates a detecting device 328 shown in FIG. 2A and FIG. 2B. As shown in FIG. 2C, the detecting device 328 includes an encoding wheel 3280 and a light detecting unit 3282. The encoding wheel 3280 is sleeved on the shaft 324 and connected to the idle roller 326. When the idle roller 326 rotates with the document 4, the encoding wheel 3280 rotates synchronously with the idle roller 326 at the speed of the idle roller 326. The light detecting unit 3282 is disposed on a side of the encoding wheel 3280 and it has a light source 3284 and a light sensor 3285. The light source 3284 emits a light beam and the light sensor 3285 receives the light beam. The light detecting unit 3282 could be a photo-interrupter. The encoding wheel 3280 is rotatable disposed between the light source 3284 and the light sensor 3285. The light sensor 3285 receives the light beams that are propagated through the grating encoding wheel 3280.

When a transparent section 3283 of the encoding wheel 3280 is positioned between the light source 3284 and the light sensor 3285, the light beam emits from the light source 3284 of the light detecting unit 3282 will be transmitted through the transparent area 3283 to the light sensor 3285. When an opaque section 3286 of the encoding wheel 3280 is positioned between the light source 3284 and the light sensor 3285, the light beam will be interrupted by the opaque section 3286. The light sensor 3285 can not receive the light beam emitted from the light source 3284. Additionally, the light detecting unit 3282 further includes a photo-electric transducing circuit that converts a photo signal into an electric signal. Afterward, the detecting device 328 generates a detection signal according to the rotational speed of the idle roller 326. The detection signal corresponds to the signal pulses of the light beam detected by the light detecting unit 3282 and the rotational speed of the encoding wheel 3280 can be determined thereby, so that the rotational speed of the idle roller 326 and the moving speed of the document 4 are determined.

Figure 2D:
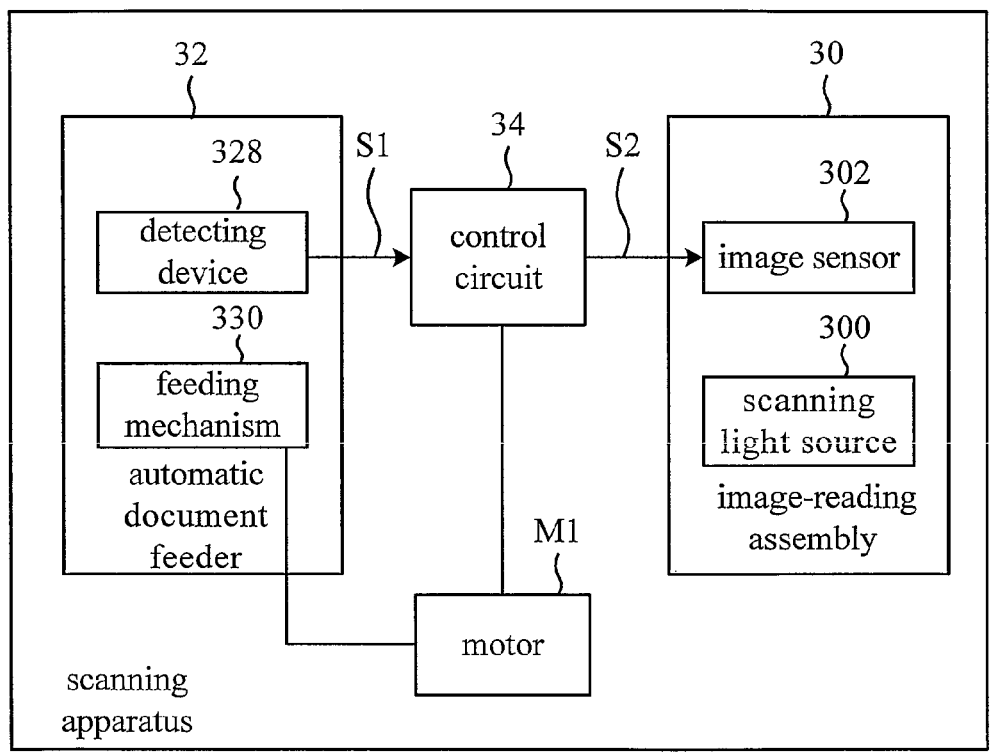
FIG. 2D illustrates a functional block diagram of the scanning apparatus shown in FIG. 2A.

Please refer to FIG. 2D. FIG. 2D illustrates a functional block diagram of the scanning apparatus 3 as shown in FIG. 2A. As shown in FIG. 2D, the image-reading assembly 30 includes a scanning light source 300 and an image sensor 302. During the scanning process, the scanning light source 300 projects a light beam onto the document 4 and then the light beam is reflected by the document 4. The image sensor 302 receives the light beam reflected by the document 4 to obtain the image of the document 4 and generates an image signal corresponding to the image of the document 4. The image sensor 302 could use some light sensing units, for example, CCD or CIS image sensors but not limited to these. The image-reading assembly 30 of the sheet-fed scanning apparatus 3 is stationary. Therefore, the document 4 needs to be transported by the feeding mechanism 330 of the automatic document feeder 32, and thus the image-reading assembly 30 and the document 4 could move relatively to each other for scanning the document 4. In this embodiment, the feeding mechanism 330 includes the feeding roller 36, the transporting roller assemblies 322, and the shaft 324 as shown in FIG. 2A for transporting the document 4. The image sensor 302 scans the document 4 and generates the image signal on a scan line-by-scan line basis. The control circuit 34 of the scanning apparatus 3 receives the detection signal S1 generated by the detecting device 328 for detecting the moving speed of the document 4. Additionally, according to the detection signal S1, the control circuit 34 outputs a control signal S2 to the image-reading assembly 30. According to the control signal S2, the image-reading assembly 30 controls the image sensor 302 to adjust the exposure time for each scan line.

In a practical application, the image-reading assembly 30 scans the document 4 on a scan line-by-scan line basis traverse to the traveling direction of the document 4. In the prior art, the exposure time of the image sensor 302 for each scan line is fixed. The exposure time is determined based on impulse signals or the rotational speed of the motor rather than the moving speed of the document. Therefore, the difference between the diameters of the rollers and the different pressures of the springs on the rollers result in the changes in the speed of transporting the document through the scanning area and a distorted scan image of the document.

According to the embodiment of the present invention, the image-reading assembly 30 controls the exposure time of the image sensor 302 for one scan line. In other words, the image-reading assembly 30 adjusts the exposure time of the image sensor 302 according to the actual moving speed of the document 4. For example, when the document 4 moves in the scanning area at a speed faster than a predetermined speed, the detecting device 328 detects and determines the moving speed of the document 4 according to the rotational speed of the idle roller 326 that rotates by the document 4 and outputs the detection signal S1 to the control circuit 34. Afterwards, the control circuit 34 outputs the control signal S2 to the image-reading assembly 30 according to the received detection signal S1 to shorten the exposure time of the image sensor 302 for one single scan line. Therefore, the vertical scan resolution of the scan image matches with the predetermined vertical resolution, and a true image of the document 4 is obtained. On the other hand, if the document 4 moves in the scanning area at a speed slower than the predetermined speed, the exposure time of the image sensor 302 is extended. To sum up, the exposure time of the image sensor 302 is adjusted inversely proportional to the moving speed of the document 4. In other words, the exposure time of the image sensor 302 is adjusted inversely proportional to the rotational speed of the encoding wheel 3280 detected by the detecting device 328.

Additionally, as shown in FIG. 2D, the control circuit 34 of another embodiment controls the motor M1 according to the detection signal S1, so that the rotational speed of the motor M1 is adjusted to maintain constant the moving speed of the document 4 in the scanning area, so as to avoid obtaining a distorted image.

Figure 3A:
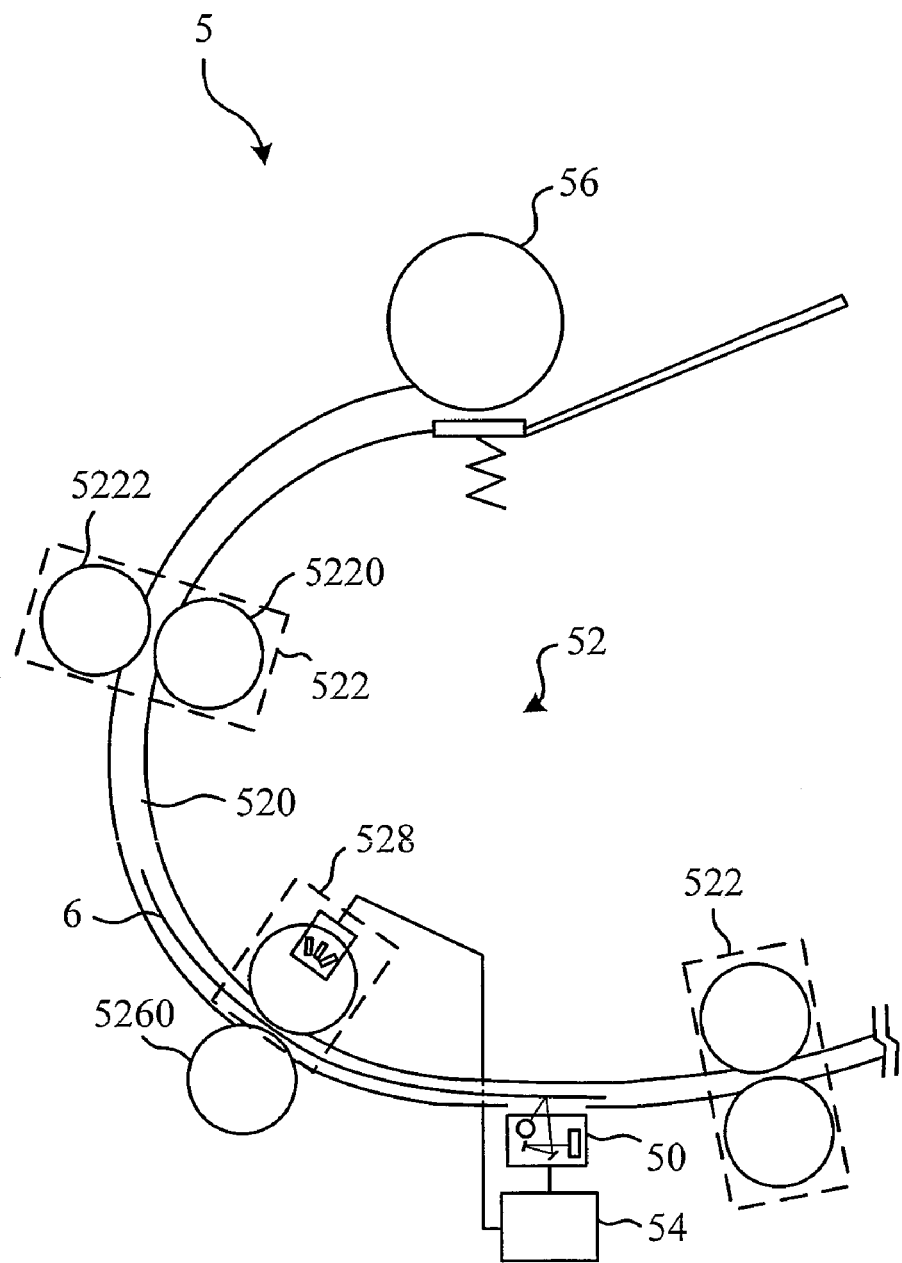
FIG. 3A illustrates a scanning apparatus of the invention according to another embodiment of the invention.
Figure 3B:
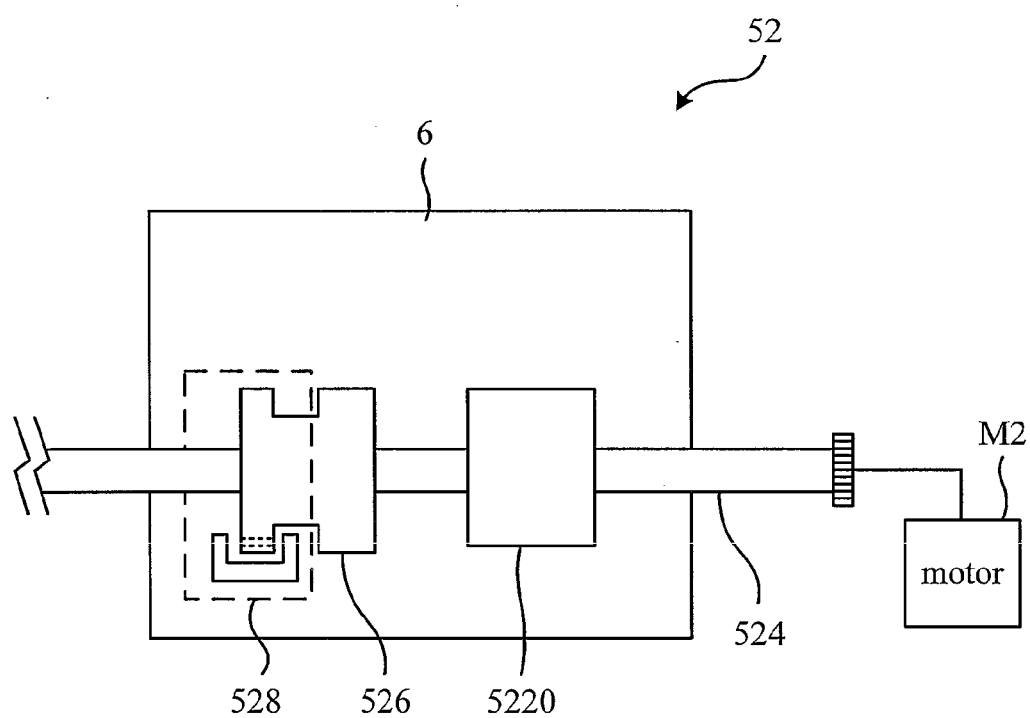
FIG. 3B illustrates a part of an automatic document feeder as shown in FIG. 3A.

Please refer to FIG. 3A and FIG. 3B. FIG. 3A illustrates an automatic sheet-fed scanning apparatus 5 according to another embodiment of the invention. FIG. 3B illustrates a part of an automatic document feeder 52 as shown in FIG. 3A. The automatic document feeder 52 of the scanning apparatus 5 includes a feeding passage 520, a plurality of transporting roller assemblies 522, a shaft 524, an idle roller 526, and a detecting device 528. The transporting roller assembly 522 includes a first roller 5220 and a second roller 5222. The second roller 5222 is disposed opposite the first roller 5220 for clamping a document 6, so that the document 6 could be transported in the feeding passage 520. Additionally, the scanning apparatus 5 further includes a feeding roller 56 for feeding the document 6 into the feeding passage 520.

The difference between this embodiment and the above-mentioned embodiment is the idle roller 526 and one of the first rollers 5220 of this embodiment are sleeved on the same shaft 524. The shaft 524 is connected to the motor M2 for driving the first roller 5220 to rotate, so as to transport the document 6. A third roller 5260 is disposed opposite the idle roller 526 for clamping the document 6. Although, the idle roller 526 is sleeved on the shaft 524, the idle roller 526 is driven by the document 6 rather than the motor M2. As above-mentioned, the detecting device 528 could detect the rotational speed of the idle roller 526 and generate a detection signal according to the rotational speed. According to the detection signal, the control circuit 54 could control the exposure time of the image sensor of the image-reading assembly 50 for each scan line.

Please note that the detecting devices of the above-mentioned embodiments are disposed near the scanning area in order to accurately detect the moving speed of the document near the scanning area, but the locations of the detecting devices are not limited to these.

Compared with the prior art, the scanning apparatus and the automatic document feeder of the scanning apparatus equip with an idle roller and a detecting device for determining the actual moving speed of the document to be scanned or being scanned. Additionally, the image-reading assembly of the scanning apparatus controls the scan timing, that is, the exposure time of the image sensor, according to the detected rotational speed of the idle roller, to avoid image distortion.

Although the present invention has been illustrated and described with reference to the preferred embodiments thereof, it should be understood that it is in no way limited to the details of such embodiments but is capable of numerous modifications within the scope of the appended claims.

What is claimed is:

1. An automatic document feeder, comprising:
   a feeding passage;
   a feeding mechanism for transporting a document along the feeding passage;
   a shaft disposed at the feeding passage;
   an idle roller sleeved on the shaft and rotated by the moving document in the feeding passage; and
   a detecting device, which comprises:
   an encoding wheel sleeved on the shaft and rotated with the idle roller; and
   a light detecting unit for detecting a rotational speed of the encoding wheel and outputting a detection signal according to the rotational speed.

2. The automatic document feeder of claim 1, wherein the light detecting unit comprises a light source and a light sensor, the light source emits a light beam, the light sensor receives the light beam, the encoding wheel is disposed between the light source and the light sensor, and the light sensor senses the light beam intermittently passing through the encoding wheel for detecting the rotational speed of the encoding wheel.

3. The automatic document feeder of claim 1, wherein the feeding mechanism comprises:
   a motor for driving the shaft;
   a first roller for transporting the document, wherein the first roller is sleeved on and rotated with the shaft; and
   a second roller, disposed opposite the first roller, for clamping the document together with the first roller.

4. The automatic document feeder of claim 1, wherein the feeding mechanism comprises:
   a transporting shaft;
   a motor for driving the transporting shaft;
   a first roller for transporting the document, wherein the first roller is sleeved on and rotated with the transporting shaft; and
   a second roller, disposed opposite the first roller, for clamping the document together with the first roller.

5. The automatic document feeder of claim 1, further comprising a third roller, disposed opposite the idle roller, for clamping the document together with the idle roller.

6. A scanning apparatus, comprising:
   an automatic document feeder comprising:
   a feeding passage;
   a feeding mechanism for transporting a document along the feeding passage;
   a shaft disposed at the feeding passage;
   an idle roller sleeved on the shaft and rotated by the moving document in the feeding passage; and
   a detecting device, which comprises:
   an encoding wheel sleeved on the shaft and rotated with the idle roller; and
   a light detecting unit for detecting a rotational speed of the encoding wheel and outputting a detection signal according to the rotational speed;
   an image-reading assembly for reading an image of the document and generating an image signal corresponding to the image of the document; and
   a control circuit, electrically connected to the detecting device and the image-reading assembly, for receiving the detection signal and outputting a control signal to the image-reading assembly to control the image-reading assembly to scan the document according to the detection signal.

7. The scanning apparatus of claim 6, wherein the light detecting unit comprises a light source and a light sensor, wherein the light source emits a light beam, the light sensor receives the light beam, the encoding wheel is disposed between the light source and the light sensor, and the light sensor senses the light beam intermittently passing through the encoding wheel for detecting the rotational speed of the encoding wheel.

8. The scanning apparatus of claim 6, wherein the feeding mechanism comprises:
   a motor for driving the shaft;
   a first roller for transporting the document, wherein the first roller is sleeved on and rotated with the shaft; and
   a second roller, disposed opposite the first roller, for clamping the document together with the first roller.

9. The scanning apparatus of claim 6, wherein the feeding mechanism comprises:
   a transporting shaft;
   a motor for driving the transporting shaft;
   a first roller for transporting the document, wherein the first roller is sleeved on and rotated with the transporting shaft; and
   a second roller, disposed opposite the first roller, for clamping the document together with the first roller.

10. The scanning apparatus of claim 6, wherein the automatic document feeder further comprises a third roller, disposed opposite the idle roller, for clamping the document together with the idle roller.

11. The scanning apparatus of claim 6, wherein the image-reading assembly scans the document on a scan line-by-scan line basis.

12. The scanning apparatus of claim 11, wherein the image-reading assembly comprises:

an image sensor, wherein an exposure time of the image sensor for scanning the image of the document at one scan line is controlled by the control signal.

13. The scanning apparatus of claim 12, wherein the exposure time of the image sensor is inversely proportional to the rotational speed of the encoding wheel detected by the detecting device.

* * * * *

UNITED STATES PATENT AND TRADEMARK OFFICE
CERTIFICATE OF CORRECTION

PATENT NO. : 8,305,658 B2  Page 1 of 1
APPLICATION NO. : 12/507528
DATED : November 6, 2012
INVENTOR(S) : Sung-Po Cheng It is certified that error appears in the above-identified patent and that said Letters Patent is hereby corrected as shown below:

On the Title Page, Item (73), the Assignee should be -- Avision Inc. --

Signed and Sealed this
Twenty-ninth Day of January, 2013

David J. Kappos
*Director of the United States Patent and Trademark Office*